United States Patent
Toennessen et al.

(10) Patent No.: US 12,196,660 B2
(45) Date of Patent: Jan. 14, 2025

(54) METHOD FOR MEASURING THE PERMEABILITY OF SUPERABSORBERS

(71) Applicant: BASF SE, Ludwigshafen (DE)

(72) Inventors: Markus Toennessen, Ludwigshafen (DE); Marc Haefner, Ludwigshafen (DE); Karsten Kraemer, Ludwigshafen (DE); Christophe Bauduin, Ludwigshafen (DE); Thomas Daniel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1169 days.

(21) Appl. No.: 16/968,225

(22) PCT Filed: Feb. 18, 2019

(86) PCT No.: PCT/EP2019/053928
§ 371 (c)(1),
(2) Date: Aug. 7, 2020

(87) PCT Pub. No.: WO2019/162216
PCT Pub. Date: Aug. 29, 2019

(65) Prior Publication Data
US 2021/0033516 A1    Feb. 4, 2021

(30) Foreign Application Priority Data
Feb. 26, 2018  (EP) .................... 18158661

(51) Int. Cl.
*G01N 15/08*    (2006.01)
(52) U.S. Cl.
CPC . *G01N 15/0806* (2013.01); *G01N 2015/0846* (2013.01)

(58) Field of Classification Search
CPC ....... G01N 15/0806; G01N 2015/0846; G01N 2015/0866; G01N 27/043; G01N 9/30; G01N 2021/3125
See application file for complete search history.

(56) References Cited

FOREIGN PATENT DOCUMENTS

| DE | 3831272 A1 | 3/1990 |
|----|-----------|--------|
| EP | 0640330 A1 | 3/1995 |

(Continued)

OTHER PUBLICATIONS

Shukla et al., Adsorption of Anionic Dyes on a Reversibly Swelling Cationic Superabsorbent Polymer, 2013 J. Appl. Polym. Sci., pp. 2251-2258 (Year: 2013).*

(Continued)

*Primary Examiner* — Paul M. West
(74) *Attorney, Agent, or Firm* — Element IP, PLC

(57) ABSTRACT

A method of measuring indices in superabsorbents, by initially charging excess aqueous solution or dispersion, swelling the superabsorbent in the initially charged aqueous solution or dispersion while stirring, dissolving or dispersing a component A in the aqueous solution or dispersion, measuring the enrichment of component A in the aqueous solution or dispersion during the swelling of the superabsorbent, using the enrichment of component A in the aqueous solution or dispersion to measure the time-dependent swelling characteristics and using these to determine the swelling constant k or the characteristic swell time τ, the index being dependent on the permeability of the superabsorbent, and ascertaining the index by means of a correlation measured beforehand between swelling constant k and index or characteristic swell time τ and index.

14 Claims, 1 Drawing Sheet

(56) References Cited

FOREIGN PATENT DOCUMENTS

EP            2535027 A1     12/2012
EP            3241861 A1 * 11/2017   ............ A61L 15/60

OTHER PUBLICATIONS

Chen, Zhenbin et al. "Conductance method study on the swelling kinetics of the superabsorbent" Electrochimica Acta 52 (2007) 1839-1846. (Year: 2007).*

Graham, et al., "Chapter 3: Commercial Processes for the Manufacture of Superabsorbent Polymers", Modern Superabsorbent Polymer Technology, ed. Buchholz, et al., 1st Edition, Nov. 1997, pp. 69-117.

Granz, et al., "Quellungsexperimente mit Superabsorber? Polymeren", Chemkon (Chemie Konkret), vol. 20, Issue 3, Jun. 26, 2013, pp. 127-130.

International Application No. PCT/EP2019/053928, International Search Report and Written Opinion, Issued on May 3, 2019.

Tanaka, et al., "Kinetics of swelling of gels", The Journal of Chemical Physics, vol. 70, Issue 3, 1979, pp. 1214-1218.

Zhang et al., Determination of the swelling behavior of superabsorbent polymers by a tracer-assisted on-line spectroscopic measurement, Polymer Testing, 62(2):110-4 (Sep. 2017).

* cited by examiner

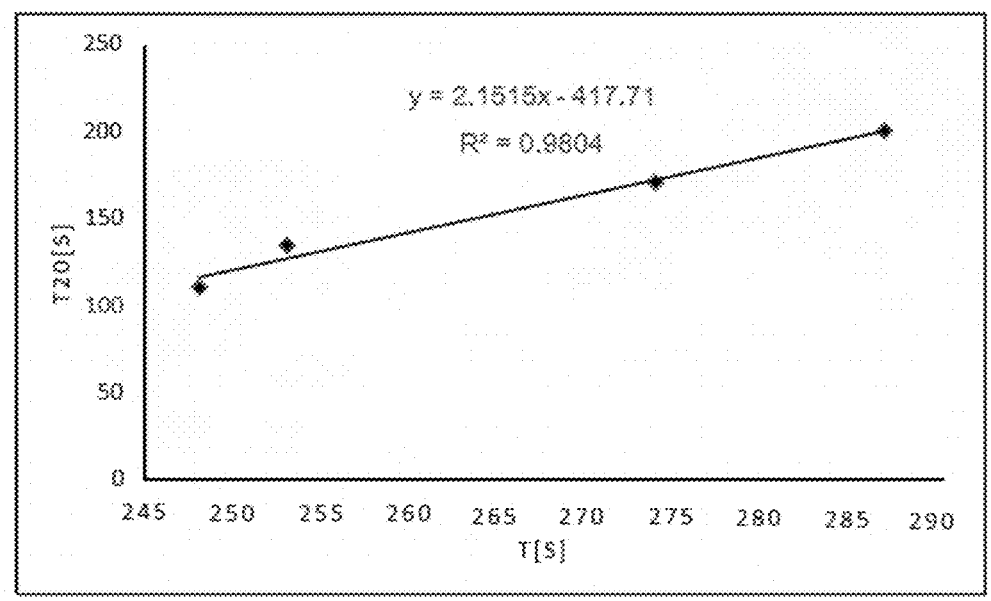

METHOD FOR MEASURING THE PERMEABILITY OF SUPERABSORBERS

CROSS-REFERENCE TO RELATED APPLICATIONS

This is the U.S. national phase of International Application No. PCT/EP2019/053928, filed Feb. 18, 2019, which claims the benefit of European Patent application No. 18158661.1 filed Feb. 26, 2018.

BACKGROUND OF THE INVENTION

(1) Field of Invention

The present invention relates to a method of measuring indices in superabsorbents, wherein the index is ascertained by means of a correlation measured beforehand between swelling constant k and index or characteristic swell time $\tau$ and index.

(2) Description of Relevant Art

Superabsorbents are used to produce diapers, tampons, sanitary napkins and other hygiene articles, but also as water-retaining agents in market gardening. Superabsorbents are also referred to as water-absorbing polymers.

The production of superabsorbents is described in the monograph "Modern Superabsorbent Polymer Technology", F. L. Buchholz and A. T. Graham, Wiley-VCH, 1998, pages 71 to 103.

DE 38 31 272 A1 discloses a method of measuring absorption rate by means of conductivity measurement.

ChemKon (Chemie konkret), volume 20, 2013, pages 127 to 130, describes the measurement of the swelling kinetics of superabsorbents by means of measuring absorbance with use of dextran blue. Polymer Testing, volume 62, 2017, pages 110 to 114, describes a very similar method.

BRIEF SUMMARY OF THE INVENTION

It was an object of the present invention to provide an improved method of measuring indices in superabsorbents. The method is especially to be suitable for automated routine analysis in the continuous production of superabsorbents.

The object was achieved by a method of measuring indices in superabsorbents, by initially charging excess aqueous solution or dispersion, swelling the superabsorbent in the initially charged aqueous solution or dispersion while stirring, dissolving or dispersing at least one component A in the aqueous solution or dispersion and measuring the enrichment of the at least one component A in the aqueous solution or dispersion during the swelling of the superabsorbent, wherein the enrichment of the at least one component A in the aqueous solution or dispersion is used to measure the time-dependent swelling characteristics and these are used to determine the swelling constant k or the characteristic swell time T, the index is dependent on the permeability of the superabsorbent, and the index is ascertained by means of a correlation measured beforehand between swelling constant k and index or characteristic swell time $\tau$ and index.

BRIEF DESCRIPTION OF THE DRAWING

FIG. 1 is a graph of T20 (S) versus T(S).

DETAILED DESCRIPTION OF THE INVENTION

In a preferred embodiment, component A is a soluble salt, for example sodium chloride, and the enrichment of component A is measured via the rise in electrical conductivity of the solution.

In a further preferred embodiment, component A is a soluble dye, for example dextran blue, and the enrichment of component A is measured via the rise in light absorption of the solution.

In a further preferred embodiment, component A is a dispersed, optionally colored solid. The solid may be organic or inorganic, and should be dispersible but insoluble in the solution for analysis. For example, very fine polystyrene particles can be dispersed in aqueous solution to form a milky phase. The enrichment of component A is measured via the rise in light absorption or light scatter of the solution.

In a further preferred embodiment, component A is a dispersed, optionally colored liquid. The liquid may be organic or inorganic, and should be dispersible but insoluble in the solution for analysis. The enrichment of component A is measured via the rise in light absorption or light scatter of the solution.

The dissolved or dispersed component A should give a stable detectable signal in the absence of the added superabsorbent over the normal period of analysis.

Component A can be detected via any suitable physical method; preference is given to analysis methods performable easily and inexpensively that are based on the properties of component A with regard to electrical conductivity, light absorption, light scatter, electrical polarizability or magnetism.

Particular preference is given in accordance with the invention to light absorption and light scatter. For the determination of these properties, it is possible to use monochromatic or di- or polychromatic light. The light may optionally be polarized. The use of polarized or di- or polychromatic light is particularly advantageous when light absorption is to be measured in addition to light scatter in order to determine the concentration of component A.

In the case of measurement of light absorption, the simultaneous unwanted presence of scatter sites in the solution (e.g. inorganic particles that become detached from the superabsorbent surface) can disrupt the measurement and necessitate inconvenient filtration prior to the measurement. By separate detection of the wavelength-dependent scattered light component, it is possible to dispense with such a filtration and to take account of the scattered light effect on the measurement of light absorption, for example by calculation. This can advantageously also be achieved by use of polarized light. For this purpose, the polarization may optionally be cyclical over time, in order to be able to detect the signal particularly efficiently. In the case of such prevention of distortion of the measurement signal, it is necessary to separately detect the contributions of light absorption and light scattering in the course of passage through the analysis medium in order to be able to reliably determine component A.

It is also possible to detect the proportions of light absorption and light scatter at different wavelengths of incident light.

When a dispersed component A is used, rather than light absorption, it is possible to use light scatter for the measurement. This form of measurement may be advantageous since there are many suitable dispersible solids or liquids that likewise do not penetrate into the swelling superabsorbents and can therefore be enriched in the dispersion for measurement.

Any known light source is suitable, optionally with color filter and/or polarization filter. Particularly suitable light sources are light-emitting diodes and lasers that can generate particular wavelengths. The measurement wavelength may be within the visible range, but may also be within the invisible range if the solvent or dispersant of the measurement solution or dispersion has sufficient transparency to this wavelength.

The amount of aqueous dispersion or solution used is preferably from 2 to 400 ml, more preferably from 5 to 300 ml, most preferably from 10 to 200 ml.

The amount of superabsorbent used is preferably from 0.1 to 20 g, more preferably from 0.2 to 10 g, most preferably from 0.5 to 5 g.

The quotient of amount of aqueous solution or dispersion used and total swelling capacity of the superabsorbent used in the aqueous solution or dispersion is preferably in the range from 1.5 to 20, more preferably in the range from 2 to 10, most preferably in the range from 2.5 to 5. Total swelling capacity is the maximum absorption of liquid by the superabsorbent from the aqueous solution or dispersion.

Component A is ideally not absorbed by the superabsorbent and remains in the solution or dispersion. The liquid absorption of the superabsorbent can be calculated via the rise in the concentration of component A in the remaining solution or dispersion according to $$Q(t) = V_{LSM} - \frac{m_A}{c(t)}$$

where Q(t) is the liquid absorption of the superabsorbent at time t, $V_{LSM}$ is the volume of the solvent used, $m_A$ is the mass of dissolved component A, and c(t) is the concentration of component A in the solution or dispersion at time t. Evaluation can also be effected by means of a computer program.

When a 0.9% by weight sodium chloride solution is used, liquid absorption after 0.5 hours corresponds roughly to the centrifuge retention capacity (CRC) according to EDANA recommended test method No. WSP 241.2 (05) "Fluid Retention Capacity in Saline, After Centrifugation". The swelling constant k or characteristic swell time $\tau$ can be calculated from the time-dependent swelling characteristics according to $Q(t)=Q_{max} \times (1-e^{-kt})$ or $Q_{max} \times (1-e^{-t/\tau})$, where Q(t) is the liquid absorption of the superabsorbent at time t and $Q_{max}$ is the maximum liquid absorption of the superabsorbent. The evaluation can be effected after linearization of the equations by graph methods using a line of best fit with slope $-k$ or $-1/\tau$ or by means of a computer program from a fitted curve of the measurement data by one of the above equations.

Particular preference is given to the calculation of liquid absorption from the measurement solution or dispersion by the Beer-Lambert law. This relates to the dependence of the attenuation of the intensity of radiation on passage through a medium containing an absorbing substance on the concentration of the absorbing substance and the layer thickness:

$$E_\lambda = \log_{10}\left(\frac{I_0}{I_1}\right) = \varepsilon_\lambda \cdot c \cdot d$$

where
$I_0$: intensity of the incident light (unit: $W \cdot m^{-2}$)
$I_1$: intensity of the transmitted light (unit: $W \cdot m^{-2}$)
c: molar concentration of the absorbing substance in the liquid
$\varepsilon_\lambda$: decadic extinction coefficient for a given wavelength $\lambda$ (this is a parameter specific to the absorbing substance)
d: layer thickness of the absorbing body through which the radiation passes (unit: m)

The light absorption or the attenuation of the light beam passing through by light scatter is measured here by a transmission measurement. The measurement solution or dispersion here is between the light source and receiver, and the light source passes through on a straight path: from the light source to the receiver. The light source and receiver may be outside the measurement vessel or in the form of an immersed probe in the measurement vessel. It is also possible that only the light source or receiver is outside the measurement vessel. The optical pathway can be manipulated by wholly or partly transparent mirrors, prisms or optical fibers in order to optimize the measurement geometry.

For detection of scattered light as disturbance variable to be corrected, an additional lateral observation by means of an independent light receiver may be conducted. What is meant here by "lateral" is that the light receiver is mounted at an angle of greater than 0° and less than 180°, preferably about 90° (=orthogonal), to the transmitted light measurement zone. It is also possible to use multiple light receivers for this purpose.

When an immersed probe is used, this can be protected by a wire screen against swelling gel particles that float through, or the measurement can be executed in the supernatant of the measurement solution. This operation dispenses with the complex filtering of the measurement solution or dispersion and simplifies automated serial measurements.

The index is, for example, the time taken for a layer of superabsorbent particles to swell by a particular value. Indices of this kind are described as T5, T10 and T20 in the test method "K(t) Test Method (Dynamic Effective Permeability and Uptake Kinetics Measurement Test Method)" described on pages 13 to 18 in EP 2 535 027 A1.

The layer preferably comprises from 0.1 to 20 g of superabsorbent, more preferably from 0.2 to 10 g of superabsorbent, most preferably from 0.5 to 5 g of superabsorbent.

The layer is typically circular and has a diameter of preferably 3 to 20 cm, more preferably from 4 to 10 cm, most preferably from 5 to 7 cm.

The correlation (calibration curve) between index and swelling constant k or characteristic swell time $\tau$ is ascertained by measuring the index of at least three superabsorbents having different permeability and additionally ascertaining the swelling constant k or characteristic swell time $\tau$. The accuracy of the correlation can be increased by increasing the number of superabsorbents of different permeability tested. The evaluation can be effected by graph by means of a line of best fit, or by means of a computer program.

The index of the superabsorbent used to establish the correlation should cover a range of preferably ±10%, more preferably ±25%, most preferably ±50%, from the average. The superabsorbents of different permeability can be produced by varying the amount of surface postcrosslinker in the surface postcrosslinking and should otherwise have maximum structural similarity. Surface postcrosslinking is described, for example, in the monograph "Modern Superabsorbent Polymer Technology", F. L. Buchholz and A. T. Graham, Wiley-VCH, 1998, pages 97 to 101.

The present invention is based on the finding that there is a correlation between the swelling constant k or characteristic swell time τ and permeability-dependent indices.

Permeability describes the permeability of swollen superabsorbent layers to aqueous solutions. A high permeability of the superabsorbents is important for diapers having a high proportion of superabsorbents. Permeability can be measured, for example, as saline flow conductivity (SFC) or gel bed permeability (GBP).

The swelling of superabsorbent layers is always also affected by the permeability of the superabsorbent used. A comparatively impermeable superabsorbent layer prevents the passage of aqueous solution and hence the complete swelling of the superabsorbent. Such an index is, for example, the liquid absorption of 20 g/g (T20) as per the "K(t) Test Method (Dynamic Effective Permeability and Uptake Kinetics Measurement Test Method)" described in EP 2 535 027 A1 on pages 13 to 18.

For measurement of the swelling constant k or of the characteristic swell time τ in accordance with the invention, the superabsorbent particles are dispersed in excess aqueous solution and no superabsorbent layer is used. Swelling constant k and characteristic swell time τ thus appear to be independent of permeability. It is surprising that there is nevertheless a correlation between swelling constant k or characteristic swell time τ and permeability-dependent indices.

In order to reproducibly determine swelling constant k or characteristic swell time τ, the suitable stirrer speed and optimal ratio of measurement solution or dispersion to superabsorbent should be ascertained in preliminary experiments and kept constant during the measurements.

In order to perform the measurement of centrifuge retention capacity (CRC) by the method of the invention, it is useful to create a calibration curve, typically a calibration line, by means of at least two known superabsorbent samples, which can then be used for the evaluation of the further measurements.

The individual steps of the test method can be easily automated. In addition, the test method enables the simultaneous measurement of further indices of the superabsorbent by a single measurement. Thus, the method of the invention enables inexpensive routine analysis, especially in the continuous production of superabsorbents.

The present invention further provides for the use of the method of the invention for quality control in the continuous production of superabsorbents.

The present invention further provides a measurement apparatus for performance of measurements by the method of the invention.

Methods:

The standard test methods described hereinafter and designated "WSP" are described in: "Standard Test Methods for the Nonwovens Industry", 2005 edition, published jointly by the Worldwide Strategic Partners EDANA (Avenue Eugene Plasky, 157, 1030 Brussels, Belgium, www.edana.org) and INDA (1100 Crescent Green, Suite 115, Cary, North Carolina 27518, USA, www.inda.org). This publication is obtainable both from EDANA and from INDA.

The measurements should, unless stated otherwise, be conducted at an ambient temperature of 23±2° C. and a relative air humidity of 50±10%. The water-absorbing polymer particles are mixed thoroughly before the measurement.

Liquid Absorption of 20 g/g (T20)

Liquid absorption of 20 g/g (T20) is determined by the "K(t) Test Method (Dynamic Effective Permeability and Uptake Kinetics Measurement Test Method)" described in EP 2 535 027 A1 on pages 13 to 18.

Centrifuge Retention Capacity

Centrifuge retention capacity (CRC) is determined by EDANA recommended test method No. WSP 241.2 (05) "Fluid Retention Capacity in Saline, After Centrifugation".

EXAMPLES

Four superabsorbents of different permeability were produced for the examples. Centrifuge retention capacity (CRC) and liquid absorption of 20 g/g (T20) of the superabsorbents were measured. The results are collated in table 1.

TABLE 1

Properties of the superabsorbents

|  | CRC [g] | T20 [s] |
| --- | --- | --- |
| SAP1 | 25.5 | 110 |
| SAP2 | 26.6 | 134 |
| SAP3 | 26.2 | 170 |
| SAP4 | 26.1 | 200 |

The time-dependent swelling characteristics of the superabsorbents were measured. For this purpose, 100 ml of a 0.9% by weight aqueous sodium chloride solution was initially charged. The initially charged solution additionally comprised 20 mg of dextran blue as component A. The concentration of dextran blue in the solution was measured by photometry. At time t=0, 0.75 g of superabsorbent was added and the measurement was started. The data obtained were used to calculate the characteristic swell time τ. The results are collated in table 2.

TABLE 2 characteristic swell time τ

|  | τ [s] |
| --- | --- |
| SAP1 | 248 |
| SAP2 | 253 |
| SAP3 | 274 |
| SAP4 | 287 |

This results in the correlation (calibration curve) shown in FIG. 1 for the liquid absorption of 20 g/g (T20).

Table 3 below shows a comparison of the measured liquid absorption of 20 g/g $(T20)_{meas}$ with the liquid absorption of 20 g/g $(T20)_{calc}$ obtained via the correlation.

Tab. 3: Comparison of the measured liquid absorption of 20 g/g $(T20)_{meas}$ with the liquid absorption of 20 g/g $(T20)_{calc}$ obtained via the correlation

TABLE 3

Comparison of the measured liquid absorption of 20 g/g $(T20)_{meas}$ with the liquid absorption of 20 g/g $(T20)_{calc}$ obtained via the correlation

|  | $(T20)_{meas}$ [s] | $(T20)_{calc}$ [s] |
| --- | --- | --- |
| SAP1 | 110 | 116 |
| SAP2 | 134 | 127 |
| SAP3 | 170 | 172 |
| SAP4 | 200 | 199 |

The table shows that the variance is less than 6% and hence is within the range of error of the actual measurement.

In addition, the liquid absorption at 0.5 hours is used to calculate centrifuge retention capacity $(CRC)_{calc}$ and this is compared with the measured centrifuge retention capacity $(CRC)_{meas}$:

TABLE 4

Comparison of measured centrifuge retention capacity $(CRC)_{meas}$ with centrifuge retention capacity obtained via time-dependent swelling characteristics $(CRC)_{calc}$

| | $(CRC)_{meas}$ [g/g] | $(CRC)_{calc}$ [g/g] |
|---|---|---|
| SAP1 | 25.5 | 25.5 |
| SAP2 | 26.6 | 25.9 |
| SAP3 | 26.2 | 26.3 |
| SAP4 | 26.1 | 25.8 |

The table shows that the variance is less than 3% and hence is within the range of error of the actual measurement.

The invention claimed is:

1. A method of measuring an index in a superabsorbent comprising initially charging excess aqueous solution or dispersion, swelling the superabsorbent in the initially charged aqueous solution or dispersion while stirring, dissolving or dispersing at least one component A in the aqueous solution or dispersion and measuring an enrichment of the at least one component A in the aqueous solution or dispersion during the swelling of the superabsorbent, wherein the enrichment of component A in the aqueous solution or dispersion is used to measure the time-dependent swelling characteristics and these are used to determine the swelling constant k or the characteristic swell time τ, the index is dependent on the permeability of the superabsorbent, and the index is ascertained by a correlation measured beforehand between swelling constant k and index or characteristic swell time τ and index.

2. The method according to claim 1, wherein component A is a soluble salt and the enrichment of component A is measured via a rise in electrical conductivity of the solution.

3. The method according to claim 1, wherein component A is a soluble dye and the enrichment of component A is measured via a rise in light absorption of the solution.

4. The method according to claim 1, wherein the amount of aqueous solution or dispersion used is from 10 to 200 ml.

5. The method according to claim 1, wherein the amount of superabsorbent used is from 0.5 to 5 g.

6. The method according to claim 1, wherein a quotient of amount of aqueous solution or dispersion used and total swelling capacity of the superabsorbent used in the aqueous solution or dispersion is in a range from 2.5 to 5.

7. The method according to claim 1, wherein the index is a time taken for a layer of superabsorbent particles to swell by a particular value.

8. The method according to claim 7, wherein the layer of superabsorbents consists of 0.5 to 5 g of the superabsorbent and covers a circular area having a diameter of 5 to 7 cm.

9. The method according to claim 1, wherein the correlation is measured by calculating the swelling constant k or the characteristic swell time τ and measuring the index of at least three superabsorbents having different permeability.

10. The method according to claim 9, wherein the superabsorbents of different permeability are produced by changing an amount of crosslinker in a polymerization and/or by changing an amount of surface postcrosslinker in a surface postcrosslinking operation.

11. The method according to claim 1, wherein the superabsorbent has an average particle size of 200 to 600 μm.

12. The method according to claim 1, wherein the superabsorbent has a saline flow conductivity of at least $10\times10^{-7}$ cm$^3$s/g.

13. The method according to claim 1, wherein the superabsorbent has a centrifuge retention capacity of at least 10 g/g.

14. The method according to claim 1 for quality control in the continuous production of superabsorbents.

* * * * *